United States Patent [19]

Chatterjea

[11] 4,387,731
[45] Jun. 14, 1983

[54] MODULATED TRANSMISSION WITH MODULATOR-LOAD-PISTON LOADING AT LINEAR RATE AFTER FULL RESET

[75] Inventor: Probir K. Chatterjea, Mt. Prospect, Ill.

[73] Assignee: Dresser Industries, Inc., Dallas, Tex.

[21] Appl. No.: 316,005

[22] Filed: Oct. 29, 1981

Related U.S. Application Data

[60] Continuation-in-part of Ser. No. 37,596, May 10, 1979, Pat. No. 4,311,068, which is a continuation-in-part of Ser. No. 890,002, Mar. 24, 1978, Pat. No. 4,216,851, which is a division of Ser. No. 693,469, Jun. 7, 1976, Pat. No. 4,135,610.

[51] Int. Cl.³ .................... F16H 47/06; F16D 33/06
[52] U.S. Cl. .................................... 137/115; 74/733; 192/4 A; 192/109 F
[58] Field of Search ............ 74/730, 731, 733, DIG. 1; 192/109 F, 4 A; 137/115, 494

[56] References Cited

U.S. PATENT DOCUMENTS

| | | | |
|---|---|---|---|
| 2,929,267 | 3/1960 | Wilson | 74/731 X |
| 2,935,999 | 5/1960 | Hock et al. | 192/109 F X |
| 3,033,333 | 5/1962 | Breting et al. | 192/4 A |
| 3,125,201 | 3/1964 | Fisher | 192/4 A |
| 3,181,385 | 5/1965 | Siler | 74/364 |
| 3,336,815 | 8/1967 | Leonard | 74/DIG. 1 |
| 3,444,968 | 5/1969 | Golan et al. | 192/4 A |
| 3,524,523 | 8/1970 | Klimex et al. | 74/DIG. 1 |
| 3,533,235 | 10/1970 | Oguma et al. | 60/357 |
| 3,882,738 | 5/1975 | Audiffred, Jr. et al. | 192/87.19 X |
| 3,965,680 | 6/1976 | Cottrell | 60/357 |
| 3,991,865 | 11/1976 | Komatsu | 137/116.3 X |
| 3,998,111 | 12/1976 | Blake | 192/4 A |
| 4,000,795 | 1/1977 | Patton | 192/109 F |
| 4,023,444 | 5/1977 | Murakami | 192/109 F X |
| 4,046,160 | 9/1977 | Horsch | 192/109 F X |
| 4,132,302 | 1/1979 | Chatterjea | 192/109 F X |
| 4,135,610 | 1/1979 | Chatterjea | 192/109 F X |
| 4,216,851 | 8/1980 | Chatterjea | 192/4 A |

Primary Examiner—Robert G. Nilson
Attorney, Agent, or Firm—B. E. Deutsch

[57] ABSTRACT

A multi-functioning hydraulic transmission control circuit in which a shifting power is provided by hydraulic pressure. The multi-functions including full resetting of the parts at the beginning of each shift, also including, according to some variations hereof as disclosed, a constant rate of rise irrespective of cylinder leakage make-up through the fill orifice and irrespective of graduality of the pressure rise desired, and additionally including a lesser and a least gradual pressure rise afforded during respective second and third speed upshifts, are all accomplished by and among a pair of direction-selector and orificed-speed-selector valve spools connected to the transmission clutch cylinders to direct valve fluid output thereto selectively, and also 1st, dump valve 2d, simulated clutch piston, 3d, load piston, 4th, modulator valve, and 5th, interacting spring parts collectively providing said directed valve fluid output, all in a valve bore common thereto, and arranged therein with the dump valve part confronted at one side by the simulated clutch piston part so as to define mutually therewith a differential pressure chamber in the bore, and confronted at the other side by first side of the load piston part so as to define mutually with that first side a signal pressure chamber in the bore, and with an opposite side of the load piston part spacedly confronting the modulator valve part so that they mutually engage therebetween the interacting spring parts in the common bore.

7 Claims, 14 Drawing Figures

MODULATED TRANSMISSION WITH MODULATOR-LOAD-PISTON LOADING AT LINEAR RATE AFTER FULL RESET

This application is a companion case of U.S. Ser. No. 37,596, filed May 10, 1979, now U.S. Pat. No. 4,311,068, Ser. No. 693,469, filed June 7, 1976, now U.S. Pat. No. 4,135,610, Ser. No. 737,966 filed Nov. 2, 1976, now U.S. Pat. No. 4,132,302 and Ser. No. 890,002, filed Mar. 24, 1978, now U.S. Pat. No. 4,216,851 all owned by the present assignee. More particularly, this application is a continuation in part of pending application Ser. No. 37,596 filed May 10, 1979, now U.S. Pat. No. 4,311,068 aforesaid, which is a continuation in part of Ser. No. 890,002 filed Mar. 24, 1978 now U.S. Pat. No. 4,216,851, which is a division of Ser. No. 693,469 filed June 7, 1976 now U.S. Pat. No. 4,135,610. The above enumerated companion case Ser. No. 737,966 is now U.S. Pat. No. 4,132,302. Because of deliberate omissions, not appearing hereinafter for the sake of brevity, details in the disclosures of each and all the foregoing are incorporated in entirety herein by reference.

This invention relates to hydraulic controls for smoothly effecting shifting of a vehicle transmission of the type in which the shifting power is provided by hydraulic pressure applied in the transmission itself, i.e., to effect a smooth power shift.

It more specifically relates to a multi-functioning hydraulic transmission control circuit including interacting valve mechanism parts which, in response to a shift being called for in a clutch-cylinder-controlled multi-speed transmission, inaugurate a fill pressure flow to the clutch cylinders concerned, prior to the subsequent fluid pressure rise effected therein; thereafter, upon completion of the fill, the parts modulate pressure rise of the hydraulic clutch fluid at substantially constant rate, from and at approximately actual fill pressure up to, and remaining at, the final pressure of engagement.

The above parts, which shift position either directly or indirectly in response to position changes made to a transmission shift lever by an operator, comprise 1st speed selector and 2d direction selector valve spools connected to the transmission clutch cylinders to direct valve fluid output thereto selectively, and also 3d dump valve, 4th a load piston, 5th another piston, 6th a modulator valve, and 7th interacting spring parts collectively providing said directed valve fluid output, all in a bore common thereto, and arranged therein with the dump valve part confronted at one side by the other piston part, 5th above, so as to define mutually therewith a differential pressure chamber in the bore, and confronted at the other side by a first side of the load piston part so as to define mutually with that first side a signal pressure chamber in the bore, and with an opposite side of the load piston part spacedly confronting the modulator valve part so that they mutually engage therebetween the interacting spring parts, 7th above, in the common bore.

According to past transmission practices in tractors and other vehicles in connection with controlled rate of rise valve assemblies each including a modulator valve and an associated load piston therefor, the speed and direction clutches provided in the transmission have been operated through the controlled rate of rise valve assembly to cushion clutch engagement. In tractor transmissions affording multi-speed ranges both forward and reverse, it is neither necessary nor desirable that the pressure rise be as gradual in other transmission speed settings aside from the high torque, first speed which tends to engage jerkily, and a transmission works at a disadvantage without having a lesser and a least gradual pressure rise afforded during respective second and third speed upshifts.

Also, it is a disadvantage that the rate of rise valve assembly is hydraulically spaced a long distance away from the transmission controlled thereby so that the valve assembly in a sense operates too remotely from, and altogether ignorantly of, the actual clutch fill pressure existing in the transmission itself. The latter disadvantage manifests itself in the functioning of the modulator valve and load piston in some cases, with the load piston never fully resetting itself, whereupon the subsequent fluid pressure rise starts at a point appreciably higher than actual clutch fill pressure in the transmission itself and so no smooth, gradual shift results.

And, in the not altogether common situation of leakage in a clutch cylinder somewhere in the range between moderate and excessive, leakage of that order can, in some instances, constitute a decided drawback to maintaining a constant rate of rise in the clutch pressure to where full pressure and full engagement occur.

According to my invention, the foregoing disadvantages and difficulties and drawbacks are materially reduced in severity if not eliminated altogether, because the functions including full resetting of the parts at the beginning of each shift, a lesser and a least gradual pressure rise afforded during respective second and third speed up shifts, and a pressure rate of rise having essentially a linear characteristic during all shifts, forwardly and reversely, are all accomplished by and among the novelly coacting parts hereinabove enumerated. One preferred way for such accomplishment resides in the present provision of a simulated clutch piston serving in the rate of rise valve assembly as the other piston, 5th above, and in the present provision of an orificed bore housing progressively opened between the speed selector valve spool, 1st above, and the signal pressure chamber in the aforesaid common bore, all as will now be explained in detail.

Features, objects, and advantages will either be specifically pointed out or become apparent when, for a better understanding of the invention, reference is made to the following description taken in conjunction with the accompanying drawings which show a preferred embodiment thereof and in which:

Figure 1:
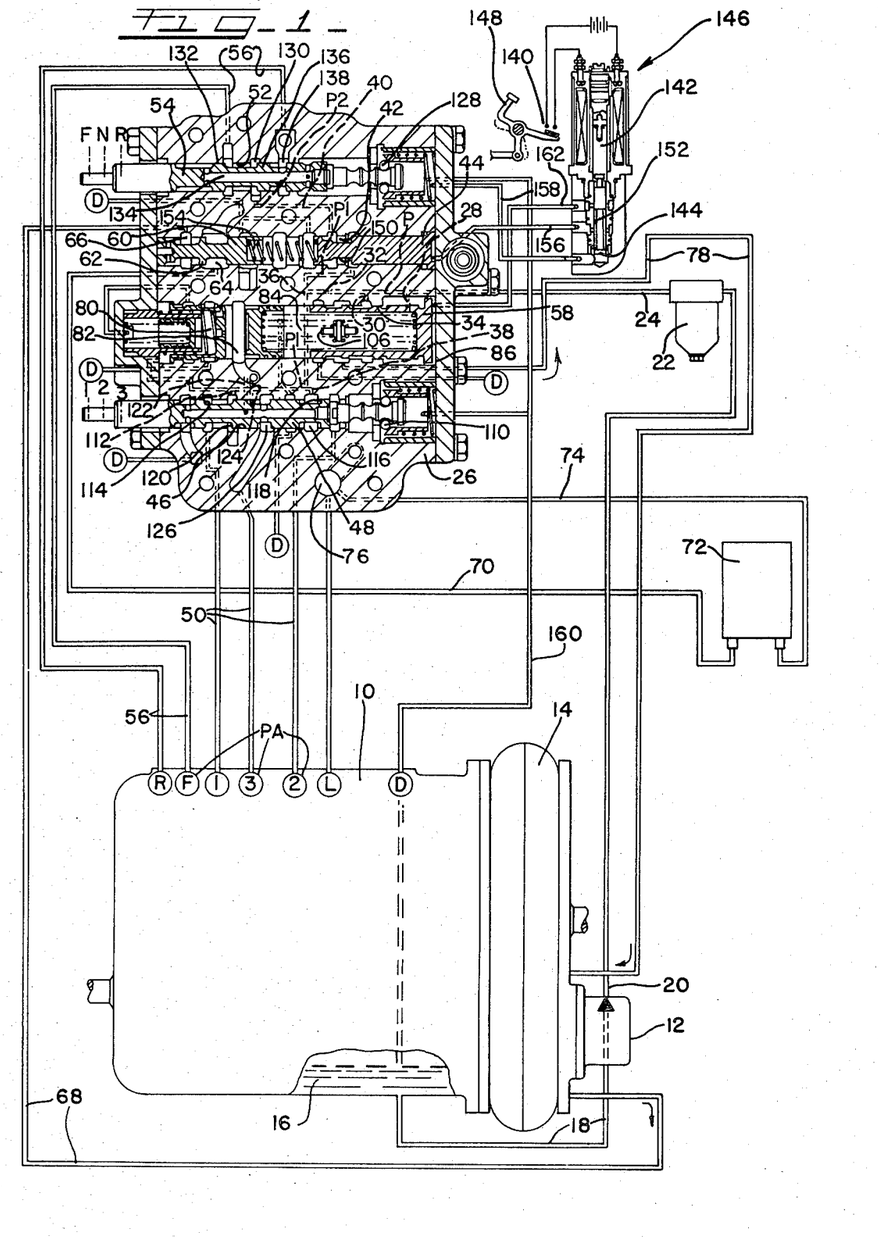
FIG. 1 is a schematic showing of a three speed forward, three speed reverse transmission and hydraulic power control system therefor, with the rate of rise valve assembly of the present invention forming part of the control system shown.

More particularly in the drawings, a reversible power-shift transmission 10 controlled in accordance with my invention is shown in FIG. 1 having three speeds in the forward range and three speeds in the reverse range. The transmission 10 has hydraulically operated, clutch units controlled first by a piston and cylinder 1, and similarly by 2, 3, F and R for power shift operation. In one of the standard ways, the clutch units controlling 1, 2 and 3 speeds are in the forward section of gearing, whereas the units controlling direction F-R are in the output section of the transmission 10.

Located forwardly of the transmission 10 are an engine driven hydraulic pump 12, and an engine driven torque converter 14 coupled to the transmission 10 to provide torque-amplified input thereto.

Hydraulic drainage from various drains denoted D is collected in a transmission sump 16, from which it is drawn through a pump intake line 18 into the inlet side of the hydraulic pump 12. From its pump output side, the pump 12 discharges hydraulic fluid through an outlet line 20 and a filter 22, thence into a pump pressure line 24 at pressure P.

Pump line pressure P enters a rate of rise valve assembly housing 26 through a modulating pressure chamber conduit 28, through a modulated bore core conduit 30, and through a rate of rise valve modulation bore restriction in line 24 forming a clutch fill orifice 32 which is adjacent a rate of rise valve assembly modulation bore 34 and which feeds a first valve modulated output pressure as a clutch pressure P1, into a housing tee 36.

The tee 36 on the downstream side of the modulation bore restriction of fill orifice 32 splits into lower and upper branches as viewed in FIG. 1. Hydraulic fluid under the clutch pressure or valve modulated first output pressure P1, flows through the lower branch into a speed valve output connection 38. In the upper branch, hydraulic fluid originally under pressure P1 is supplied to a direction valve output connection 40 at a valve modulated second pressure P2 by way of a neutralizer valve bore 42 occupied at one end by a neutralizer valve spool 44.

In the valve housing 26, in a speed valve bore 46 interposed in the speed valve output connection 38, a three-position speed valve spool 48 is reciprocally positioned by the operator to selectively supply valve modulated first output fluid to a set of individual speed lines 50 leading to each one of the pistons and cylinders 1, 2, 3 of the clutch units in the forward section of the transmission 10. Each line 50 is a long one and, due to friction and restriction therein, the actual clutch pressure PA of the clutch units will be substantially less than the valve modulated first output pressure P1.

Similarly, in a direction valve bore 52 interposed in the direction valve output connection 40, a three-position direction valve spool 54 is reciprocally positioned by the operator to selectively supply valve modulated second output fluid at pressure P2 to a pair of individual direction lines 56 leading to pistons and cylinders F, R of the clutch units in the output section of the transmission 10. Due to hydraulic friction and restriction in each of the direction lines 56 which afford a long and somewhat tortuous path to flow of hydraulic fluid therein, actual pressure PA in the piston and cylinder F and in the piston and cylinder R will be substantially less than the pressure P2 in the direction valve output.

TORQUE CONVERTER—FIG. 1

In the operation of the hydraulic system for torque amplification, hydraulic fluid keeps the torque converter 14 filled, being arranged with its supply of fluid provided by a rate-of-rise pressure modulating valve 58 located in the right end of the rate-of-rise valve assembly modulation bore 34, and with its back pressure maintained by a torque converter regulator valve spool 60 reciprocal in the left end of the neutralizer valve bore 42. More particularly, a back pressure land 62 on the spring seated spool 60 is operatively located between a second core groove 64 and a first core groove 66 connected to a converter outlet line 68. As hydraulic pressure rises between the end of the spool 60 and the left end of the bore 42 against which it is seated, the spool 60 moves rightwardly in response to this increasing converter back pressure, and the intervening land 62 thereon opens and intercommunicates the first bore groove 66 and the second bore groove 64, which latter discharges the excess hydraulic fluid therefrom through a cooler inlet line 70, an hydraulic torque converter cooler 72, a cooler outlet line 74, and a housing oil gallery 76, thence into a transmission lube system L and ultimately into the transmission sump 16.

The rate-of-rise pressure modulating valve 58 and a torque converter inlet line 78 provide a direct connection between the modulated bore core conduit 30 and the torque converter 14 on its inlet side. More particularly, in the rate-of-rise valve assembly modulation bore 34, which bore is divided into the respective differential pressure chamber 80, signal pressure chamber 82, spring chamber 84, and modulating pressure chamber 86 as viewed in that order from left to right in FIG. 2, the modulating valve 58 is of piston shape and arranged with the piston end hydraulically separating the spring chamber and modulating pressure chamber 84 and 86 in the bore 34.

Figure 2:
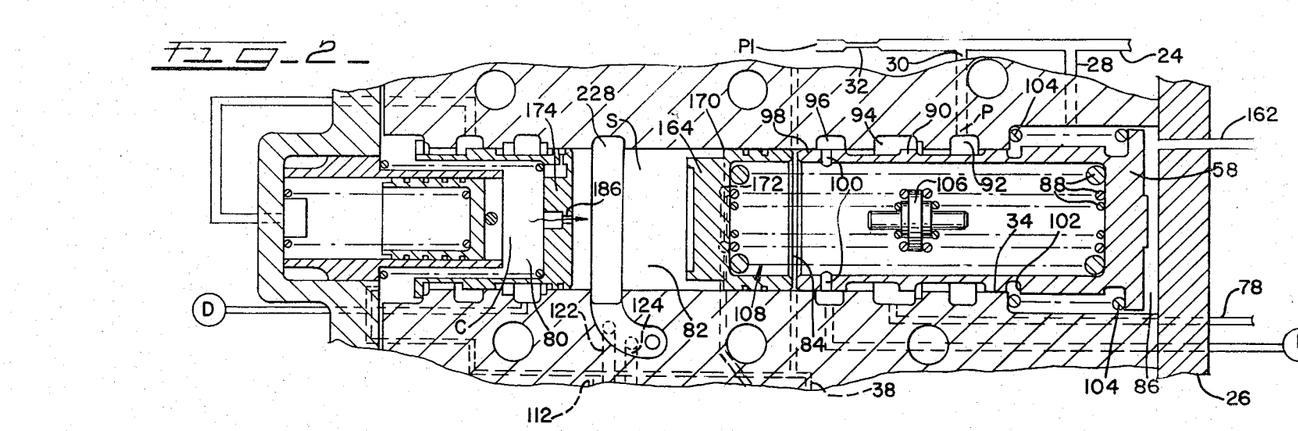
FIGS. 2, 3, 4 and 5 are all enlarged cross sectional views of the rate of rise valve assembly of the invention, the same as appears as a detail in FIG. 1 and with the components shown in FIGS. 2-5 in various operating-positions.

During normal regulation, the valve 58 takes the regular intermediate open position as shown in solid lines in FIGS. 1 and 2, having been moved by pressure in the modulating pressure chamber 86 to a point where the hydraulic pressure is exactly equal to and balanced by a partially compressed spring group 88 pressing against the inside of the valve piston end. In that intermediate position shown, a regulating valve land 90 maintains the pump pressure P in a bore core 92 by controlling flow of excess fluid into a bore core 94 thence to the torque converter (not shown in FIG. 2) through the torque converter inlet line 78. Additional pressure encountered in the modulating pressure chamber 86, as due to stiff, very cold oil, will bring about progressive leftward opening movement of the valve 58 causing cooperation between a bore core 96 connected to drain D and dual function dump land 98 on the valve 58. The dump land 98 has a valve edge with a first function whereby oil from the cores 92 and 94 will go directly to the bore core 96 and drain D, at least until the oil warms up on the system. The dump land 98 also has ports 100 performing the second function, in all positions of the valve 58, of continuously venting the spring chamber 84 to drain D by way of the core 96. A shoulder 102, formed on the valve 58 adjacent a valve seating spring 104, engages the fixed seat for spring 104 and limits progressive valve opening movement to a relatively short amount of overall valve travel.

An intermediate guide and seat 106 aligns inner ones of the springs of the spring group 88 which are connected thereby to act in tandem within the spring chamber 84.

The spring group 88 and associated parts within the rate of rise valve assembly modulation bore 34 form a rate of rise valve assembly generally indicated at 108 and described in detail shortly.

SPEED VALVE—FIG. 1

When the spool 48 in the speed valve bore 46 is detented at 110 in the first or 1 speed position as shown in solid lines, the speed lines 50 to the respective piston and cylinder units 2 and 3 are connected by the spool 48 in readily discernible paths to drain D; at the same time from the output connection 38 in which the speed valve is located, the valve modulated first output pressure P1 through a short conduit 112 is admitted by an open spool land 114 into an individual speed line 50 and the clutch piston and cylinder 1 so as to prepare the transmission 10 for first speed drive.

Progressive inward movement of the speed valve spool 48 rightwardly so as to assume an intermediate or 2 position, causes the piston and cylinder 1 and 3 to be connected by the spool 48 to drain D; at the same time valve modulated first output pressure P1 from the output connection 38 and a core groove 116 is admitted by an open spool land 118 into the appropriate speed line 50 thence into piston and cylinder 2 to prepare the transmission 10 for second speed drive. Also at the same time, a spool land 120 uncovers the mouth of a first auxiliary passage 122 interconnecting the short output conduit 112 and the signal pressure chamber 82 so as to provide a first supplement to the flow of fluid in the latter for a reason later to be disclosed. That same spool land 120 upon further depression of the spool 48 to extreme rightward position corresponding to speed 3, uncovers the mouth of a second auxiliary passage 124 between the short output conduit 112 and the signal pressure chamber 82 to afford a second supplement to the flow of hydraulic fluid into the latter.

When the spool 48 is fully depressed rightwardly for the speed 3 condition, the clutch piston and cylinder units 1 and 2 are connected to drain D; at that same time, the spool land 120 uncovers and leaves open a core groove 126 to pressure P1 in the short output conduit 112, so as to pressurize the clutch piston and cylinder 3 and prepare the transmission 10 for speed 3 condition.

DIRECTION VALVE—FIG. 1

When the spool 54 in direction valve bore 52 is detented at 128 registering at position F for forward drive as shown by solid lines, the valve modulated second output pressure P2 which enters a core groove 130 and direction valve bore 52 is directed by a spool land 132 into the appropriate individual direction line 56 and introduced by the latter into the piston and cylinder F to complete forward drive in the transmission. The individual line 56 to the clutch piston and cylinder R is meantime connected by the spool 54 in a path leading through the hollow core 134 of the latter, past the detent 128, and thence to drain D in the transmission 10.

When the direction valve spool 54 is partway depressed into an intermediate position corresponding to N to neutralize the transmission 10, the pressurized core groove 130 of direction valve bore 52 is blocked off by the spool land 132 and by an adjacent land 136, whereas both direction lines 56 are connected to drain D in discernible direction valve paths in FIG. 1. So the direction clutches are disengaged and no drive is transmitted through the transmission 10.

Finally upon full depression of the spool 54 into its extreme position corresponding to the R condition of the transmission for reverse, the spool land 136 directs pressure P2 from the core groove 130 into a core groove 138, whence it goes through the appropriate direction line 56 into the clutch piston and cylinder R, completing the reverse path through the transmission 10. At the same time, the direction line 56 to the clutch piston and cylinder F for forward drive is connected by the spool 54 in a path including the hollow core 134, past the detent 124, thence to drain D so as to keep the transmission forward drive inactive.

NEUTRALIZER—FIG. 1

The neutralizer valve spool 44, which in a rightward position has a condition of repose as shown, and which has a controlled, shifted position to the left as viewed in FIG. 1, is under the electro-hydraulic control of a brake operated, transmission neutralizer contacts component 140, an electric neutralizer valve solenoid 142, and an hydraulic neutralizer valve component 144, all forming parts of a three-way cartridge solenoid valve assembly generally indicated at 146. The valve assembly 146 is in turn controlled by the vehicle brake pedal 148 in a way automatically to neutralize the transmission 10 at all times during which the vehicle brakes are applied.

During normal vehicle running conditions, the neutralizer valve spool 44 occupies its rightward or repose position, and so do the brake pedal 148 and valve assembly 146, all as shown in solid lines in FIG. 1. During such condition of repose, a spool groove 150 on valve spool 44, a spool groove 152 on valve component 144, and an interaction spring 154 between the torque converter regulator valve spool 60 and the neutralizer valve spool 44 urging them to seat in opposite ends of the bore 42, are performing as follows. The spool groove 150 completes an hydraulic path between the housing tee 36 and direction output connection 40; therefore, the valve modulated first and second output pressures P1 and P2 are equal to one another, enabling the selected ones of the speed and direction clutches to remain operative so that the transmission 10 stays engaged. The spool groove 152 completes an hydraulic path leading from the end of the bore 42 occupied by the corresponding end of the neutralizer valve spool 44, through a neutralizer valve line 156, thence into the groove 152, and a pair of series connected drain lines 158 and 160 leading to to drain D in transmission 10. So the unopposed spring 154 holds the neutralizer spool 44 in its unshifted position of repose as shown in solid lines in FIG. 1, allowing the transmission 10 to continue to drive.

However depression of the brake pedal 148, into the broken line position shown, not only applies the vehicle brakes by conventional means, not shown, but also moves a switch arm counterclockwise as viewed in FIG. 1 closing the transmission neutralizer contacts component 140 and setting the transmission 10 in neutral. More particularly contact closing, in the battery solenoid circuit illustrated, electromagnetically causes the valve solenoid component 142 to rise as viewed in FIG. 1 and to shift upwardly the spool groove 152 therewith. Therefore, the modulating pressure chamber 86 at pressure P is interconnected by way of a pressure line 162 with the spool groove 152, and at the same time the neutralizer valve line 156 is connected with the same spool groove 152, thus pressurizing that end of the valve bore 42 which is occupied by the corresponding end of the neutralizer spool 44.

Accordingly, against the resistance of spring 154, the neutralizer spool 44 is pressure actuated under pressure P into its shifted position, to the left as viewed in FIG. 1; the neutralizer spool groove 150 interconnects the direction valve output connection 40 and drain D, whereas pressure P1 from the housing tee 36 is blocked off by the main portion of the neutralizer spool 44. Hence, the F-R direction clutch units are disengaged, interrupting the transmission of power in transmission 10 always contemporaneously with brake application. So the vehicle brakes stop the motion or arrest the motion of the vehicle to the degree desired, without having to overcome traction power of the engine as well.

Figure 3:
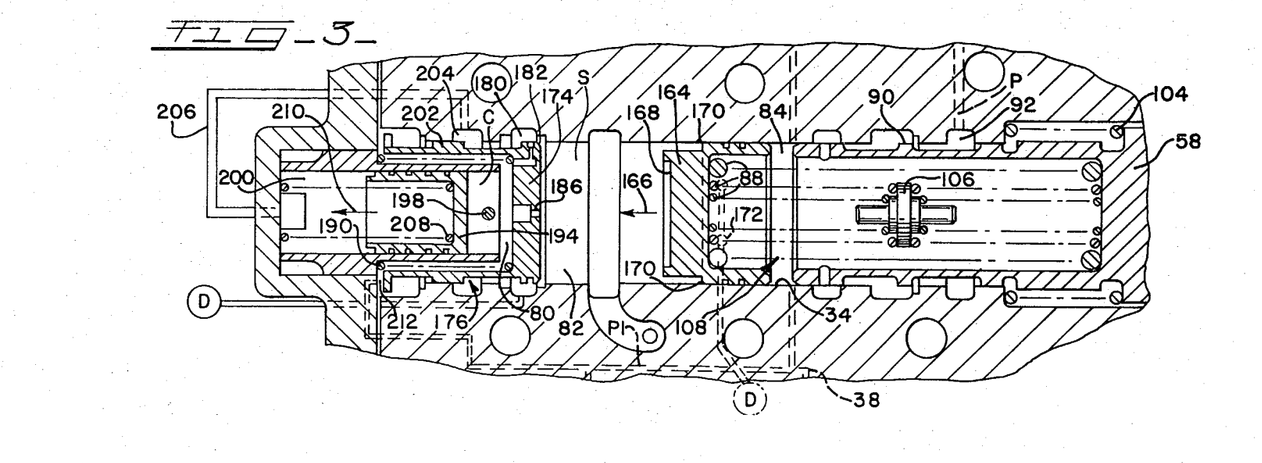

RATE OF RISE VALVE ASSEMBLY—FIG. 3

Forming part of the rate of rise valve assembly 108, a load piston 164 is controlled by hydraulic pressures of signal pressure chamber 82 and by mechanical pressure of the spring group 88 either to perform a resetting stroke in the bore 34 in the direction of an arrow 166, or to perform a loading, opposite reciprocal stroke to the right as viewed in FIG. 3. The piston 164 has a crown head which is formed with a shallow central recess 168 and which is subject to signal pressure S, and has the spring group 88 seated inside the head so as to interact with the modulating valve 58 by reacting thereagainst and loading it for the desired rate of rise modulation.

About the load piston 164, a uniplanar ring includes four spaced apart control edges 170 that establish cooperation with two drain connected bore ports 172, which ports are in the path of reciprocation of the piston 164 and which are uncovered by the control edges 170 during piston movement to the right as viewed in FIG. 3.

Thus, travel of the load piston 164 during its loading stroke is limited by the piston 164 venting the signal pressure S to drain immediately the ports 172 are uncovered, and travel for resetting in the direction of the arrow 166 is limited as the piston 164 stops immediately upon contact with, or in practice just short of, the dump valve 174 of an adjacent signal pressure control assembly 176.

Figure 4:
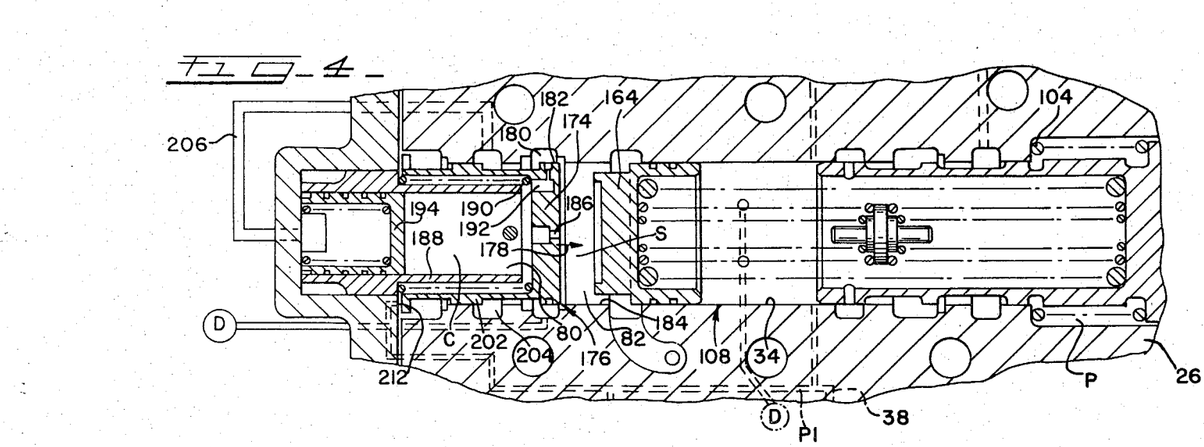

DUMP VALVE—FIG. 4

As viewed in its transient position adjacent signal pressure chamber 82 in FIG. 4, the dump valve 174 will be appreciated to have primary control over the emptying and filling of chamber 82. That is, leftward movement of the dump valve 174 opposite to the direction of an arrow 178 will vent the signal pressure chamber 82 through a bore core 180 to drain, tending to empty the chamber. But movement of the dump valve 74 in the direction of the arrow 178 causes a sealing edge 182 thereof to seal off an adjacent land 184 in the bore 34 and allow a constant differential, constant flow, timing orifice 186 fixed in the center of the dump valve 174 to fill the signal pressure chamber 82. The dump valve cavity pressure C within the differential pressure chamber 80 causes essentially one way flow through the fixed orifice 186.

Within the dump valve cavity, a sleeve 188 is fixed and provides the seat for a light spring 190 urging the dump valve 174 to its sealed closed position in the direction of the arrow 178. The head of the valve 174 incorporates a pressure equalizing groove formation 192 to keep the valve centered and free from binding.

Figure 5:
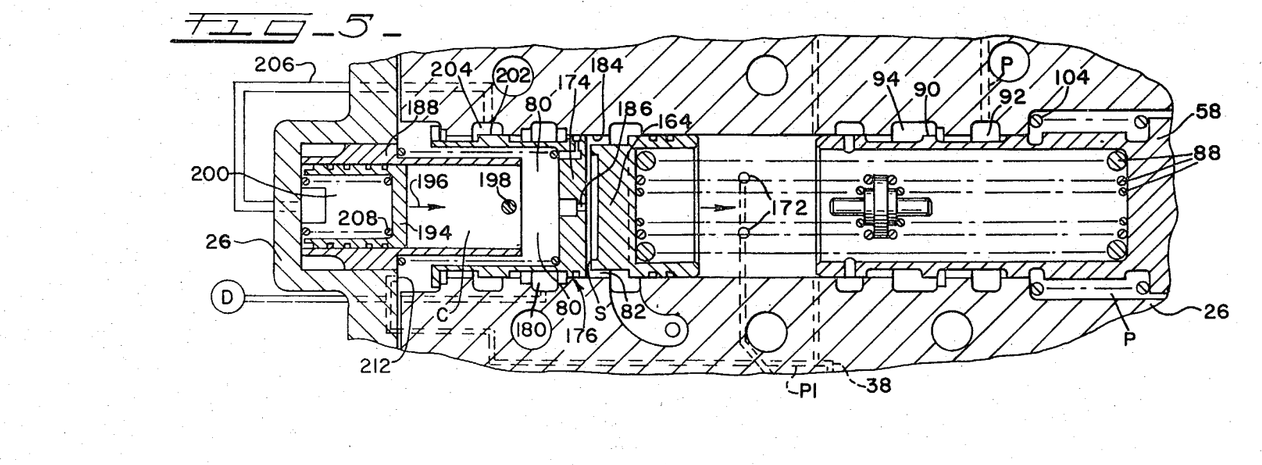

SIMULATED CLUTCH FILL PISTON—FIG. 5

Within the fixed sleeve 188 of the signal pressure control assembly 176, a simulated clutch fill piston 194 is reciprocally mounted to move rightwardly in the direction of an arrow 196 to an extreme position limited by a cross pin 198 fixed in the rate of rise valve assembly housing 26, or to move leftwardly opposite to the arrow's direction and bottom itself against the adjacent portion of the housing 26.

The dump valve 174 is in sole control of directing fluid to fill and to empty the piston cavity 200 of piston 194. In the valve-closed position of the dump valve 174 as shown in FIG. 5, a dump valve land 202 diverts valve cavity pressure C from the differential chamber 80 through a bore core 204 leading to the back of the piston, thence into a passage 206 and the piston cavity 200. Pressure is thus equalized across the piston 194 enabling a light spring 208 inside the head of the piston to move the latter on a complete resetting stroke in the direction of the arrow 196. But when the dump valve 174 is in the dump position to the left of the position shown in FIG. 5, the land 202 vents the bore core 204 through the bore core 180 to drain D, enabling the valve cavity pressure C of the differential pressure chamber 80 to overcome the light spring 208 and force the piston 194 leftwardly as viewed in FIG. 5 on a complete stroke.

STEADY STATE CLUTCH ENGAGEMENT—FIG. 2

C is equal to P1, P1 is equal to P, and P is 30 psi greater than pressure S, according to this dynamic equilibrium condition as shown here. The condition can be accurately mechanically set, in view of the spring chamber 84 always being maintained in drain pressure condition, in view of the flow through the rate of rise valve modulation bore restriction or clutch fill orifice 32 being inconsequential when the clutches are fully engaged, and in view of the strategic placement of the spring group 88 in the spring chamber and of the valve seating spring 104 engaging the head of the rate of rise pressure modulating valve 58.

More particularly, in spite of smallness or the magnitude of flow in the direction of the arrow through the restrictive timing orifice 186, the spring group 88 is precisely calibrated so that the active one of the four control edges 170 will restrict outflow from the bore ports 172 constituting drain holes to the same restricted rate, thus maintaining the signal pressure S in chamber 82 at a constant regulated valve, e.g., 270 psi. On the other hand, the valve seating spring 104 which is precalibrated to a moderate value, such as the mechanical equivalent to 30 psi, will act in conjunction with the same spring group 88 having a mechanical force equivalent to 270 psi pressure, to cause rate of rise pressure modulating valve 58 to regulate by means of the valve land 90 thereon with the total of 300 psi as the pressure P. Because as noted, P equals P1 and P1 equals C, cavity pressure C in the differential chamber 80 will maintain constant flow through the restricted fixed orifice 186 creating the 30 psi pressure drop consistent with the signal pressure S remaining at 270 psi.

The restrictive flow through the timing orifice 186 making its way out the drain holes 172 plus the regular leakage in the selected clutch of each of the two clutch groups totals a relatively minor flow in terms of the clutch fill orifice 32 which generates a barely perceptible pressure drop thereacross.

DUMP, INITIATING CLUTCH FILL—FIG. 3

Fill time is so comparatively short in a shift cycle of the transmission, that the problem is to reduce the dump valve cavity pressure C to a low point and in turn reduce the signal pressure S to a low point, such that the resetting load piston 164 moving in the direction of the arrow 166 will be able fully to complete the resetting stroke before the fill portion of the clutch cycle can elapse. The complicating aspect is that the pressure P1 of the valve output fluid which restrictively enters the dump valve cavity of which the pressure is C, must have a value of about 50 psi in order that, at the clutch itself, the effective pressure PA actually filling the clutch will be about 20 psi. The tendency which therefore must be overcome is that the signal pressure S will be too high when, preferably, it should be at or about actual clutch fill pressure of 20 psi so as not unduly to oppose full reset of the load piston 164.

In approaching the present solution to the problem, let it be assumed a shift is being made with the transmission in first gear, and with a change in the direction clutches, e.g., from reverse R to forward F. Hence, the clutch piston and cylinder unit 1 will remain filled whereas the clutch piston and cylinder unit F, not shown, will be empty and require complete filling. So all pressures in the system will drop drastically because 20 psi actual clutch filling pressure is all that is required by the empty clutch piston and cylinder.

P is 10 psi greater than P1, P1 is equal to P2, P2 is 30 psi greater than S, S is equal to C, and C is equal to actual clutch fill pressure PA (20 psi), according to the condition illustrated in this figure, with substantial flow through the large clutch fill orifice 32 creating a 10 psi drop therein because of the large volume of fluid temporarily going therethrough. A glance for the moment back at FIG. 1 and specifically at extended-length direction lines 45 will make it clear how fluid from direction valve spool 56 can drop 30 psi in pressure from P2 to the actual clutch pressure PA by the time it arrives at the selected clutch piston and cylinder unit F.

The cascading drops in pressures PA, P2 and P1 due to empty piston and cylinder unit F on the line, and the drop in cavity pressure C due to the precipitous drop of the valve modulated first output pressure P1, results in the residual 270 psi signal pressure S forcing the dump valve piston 174 in the direction of the arrow 210 in FIG. 3 to the open position causing two coordinated actions. First, the dump valve control edge 182 opens a path from signal pressure chamber 82 through bore core 180 to drain D, reducing the signal pressure S to about 20 psi and allowing the load piston 164 under force of the spring group 88 to reset leftwardly in the direction of the arrow 166. Second, the dump valve land 202 vents fluid from the piston cavity 200 and the passage 206 from the back of the piston and bore core 204, through the bore core 180 thence to drain D, enabling the approximately 20 psi cavity pressure C to move the piston 194 in the leftward direction of the arrow 210 against the minor resistance of the light piston spring 208.

So, contemporaneously with only the major first part of clutch fill, the simulated clutch fill piston 194 makes a complete control stroke, enlarging the volume of the differential pressure chamber 80 at a fairly steady rate against the opposition of the light spring 208 within the piston head. At the same time fluid flow in the valve output connection 38 at pressure P1 will restrictedly enter the differential pressure chamber 80, through appropriate admission means such as through a reduced diameter hole 212 at the back of the dump valve 174, at reduced pressure. As a matter of practice, the cavity pressure C and the signal pressure S are substantially equal, with the latter pressure S (about 20 psi) being only enough the higher of the two by the minor amount necessary to keep the light spring 190 under compression and the dump valve 174 hydraulically held open throughout clutch fill. Flow at this time through the timing orifice 186 is essentially zero.

Under the favorable clutch fill condition just outlined, the load piston 164 will execute a complete resetting stroke contemporaneously with only the major first portion of clutch fill time, balanced against the existing 20 psi signal pressure, the spring group 88 will relax except to the extent of transmitting an equivalent of 20 psi pressure, and the modulating valve 58 will be modulating the line pressure P in the range of 50 or 60 psi or so.

END OF FILL—FIG. 4

Toward the end of clutch fill, the load piston 164 will have taken its extreme position of full reset as indicated and the simulated clutch piston 194 in this figure is shown to have completed its control stroke. Inherent with the ending of clutch fill, flow through the clutch fill orifice 32, not shown, drastically reduces, the pressure drop thereacross disappears, and the valve modulated first output pressure P1 and second output pressure P2 increase about 10 psi immediately to the pump line pressure of, say, 60 psi. The dynamically balanced dump valve 174 becomes hydraulically unbalanced because of the pressure rise in the P1 connected hole 212 leading to the back of the valve 174. The valve 174 therefore shifts to the right in the direction of the arrow 178 and closes, causing two actions.

First, the dump valve land 202 immediately equalizes the pressure across the simulated clutch piston 194, bypassing from the back of the piston 194, through the line 206 and bore core 204, thence into the differential pressure chamber 80 to which the head of the piston 194 is exposed. Second, the valve sealing edge 182 seals off the drain bore core 180 from the signal pressure chamber 82, and flow commences through the fill orifice 186 from the differential pressure S of the signal pressure chamber 82, to increase pressure S.

Immediately, hydraulic pressure on the load piston 164 will make its presence felt so as to establish starting pressure for the desired pressure rate of rise in the affected clutch, as can be understood from FIG. 5.

RATE OF RISE, STARTING PRESSURE—FIG. 5

With the valve parts in position as illustrated for this condition, the unopposed light piston spring 208 will start the simulated clutch fill piston 194 in the direction of the arrow 196 to reset the piston against the stop pin 198. Also, the rising signal pressure S will about simultaneously start the load piston 164 in the direction of the adjacent arrow on its load stroke.

At outset of movement of the load piston 164 on its load stroke, compression will increase in the relatively relaxed spring group 88, communicating itself to the modulation valve 58 and causing the valve land 90 to commence restricting outflow from the bore core 92 which carries pump line pressure P. There thus begins a linear rise of pressure P and, proportionately, a linear rise of pressures P1, P2, S, C, and PA.

Therefore, as the piston 194 in FIG. 5 completes its resetting stroke and the load piston 164 completes its load or control stroke, the spring 104 maintains a continuous 30 psi differential of the linearly rising pressures C, P1, and P2 above signal pressure S, the differential pressure across the timing orifice 186 remains constant at 30 psi, the flow rate through the orifice 186 remains constant throughout the pressure rate of rise, and the rate of movement of the piston 164 stays constant throughout the linear pressure rise, which occurs at constant rate for each load or control stroke of the piston 164. That is to say, for a given stroke the rate of rise of pressure does not change although the rate for one stroke may differ from other strokes for reasons hereinafter set forth.

Figures 6, 7:
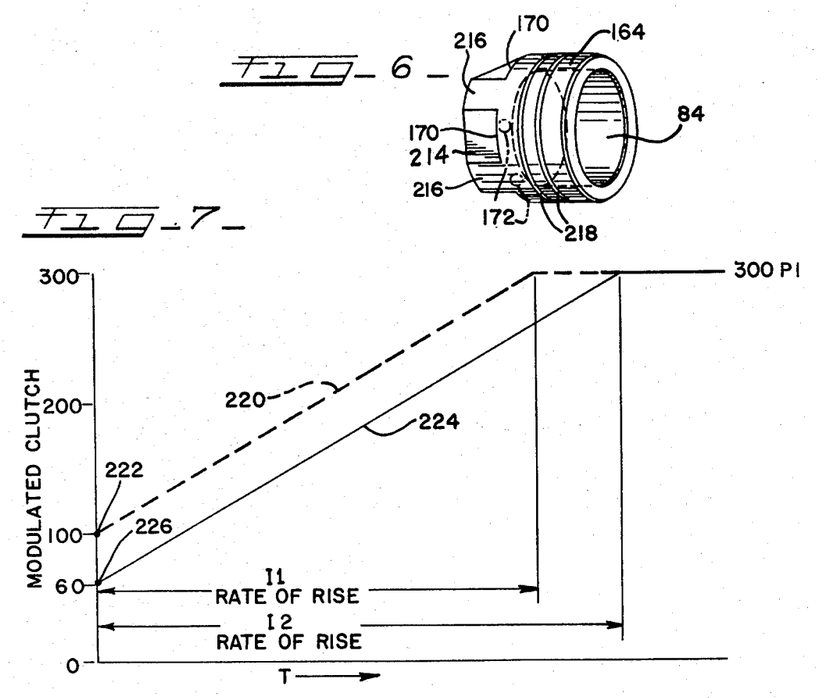
FIG. 6 is an isometric view of an hydraulic load piston appearing in longitudinal cross section in each of the foregoing figures.
FIG. 7 is a graphical representation of a portion of pressure traces desirably and undesirably associated with the operation of the control system foregoing.

LOAD PISTON—FIG. 6

The referred to uniplanar four spaced control edges about the crown of the load piston 164 form part of eight consecutive outside portions thereof, alternate ones of which are the same flats 214 defining the sealing control edges 170, and each remaining one of which is a land 216 retaining its original cylindrical shape and being identical to the other three lands.

The four sealing edges 170 control the bore ports 172 constituting drain holes and, in practice, the drain holes as superimposed in FIG. 6 subtend a central angle slightly in excess of the arcuate width, measured in a circumferential direction, of each of the lands 216. Irrespective thereof of the rotative position of the load piston 164 in bore 34, not shown, one sealing edge 170 will have a bore port 172 aligned in its path of reciprocation so that, by unblocking same, the sealing edge 170 concerned will determine the end of travel of the load piston 164 on each load stroke at the same point essentially.

Hydraulic balancing or centering grooves 218 are formed at spaced locations in the exterior of the load piston 164 adjacent its open end.

RATE OF RISE CURVES—FIG. 7

Without provision for my novel arrangement just described, clutch pressure at the end of fill can be substantially high due to incomplete recycling of the load piston, not shown, as illustrated by the broken line rise curve 220 in this figure. That is to say, the end of fill piston 222 on the curve 220 represents a residual 100 psi pressure, and the modulated rate of rise will thus start off too soon to effect clutch engagement properly. Under my novel arrangement, however, the load piston is ready for a complete control stroke, at the point immediately after clutch fill when the dump valve shifts to the right and the simulated clutch piston starts resetting movement back to its starting position, and the rate of rise proceeds in the desired way along the solid line rise curve 224. The end of fill point 226 on the curve 224 represents the desired 60 psi.

While the end of fill point is critical insofar as pressure is concerned, the shorter rate of rise interval 11 is not in and of itself undesirable; that is to say, the desired rate of rise interval 12 indicated in FIG. 7 may be effectively shortened in a manner now to be described, without failing to effect proper clutch engagement.

SHIFT IN SECOND GEAR—FIGS. 7, 1, 2

In FIG. 7, the pressure trace will desirably have a steeper straight slope than shown by the curve 224 when a direction shift is made with the transmission 10, not shown, in second gear. That is, in the higher speed gear compared with first gear, a clutch change is not felt so abruptly; hence the clutch can go into engagement smoothly at a relatively larger constant rate of rise of pressure, and the interval 12 will consequently be shorter.

In FIG. 1, the speed valve spool 48 in the way described has the speed 2 position wherein the spool land 120 uncovers the mouth of the first auxiliary passage 122 which is in reality an orifice. Such orifice provides a second means of connection to the signal pressure chamber 82, supplementing the timing orifice flow described already as the first means of connection to the signal pressure chamber 82.

In FIG. 2, the orifice formed by the first auxiliary passage 122 communicates restricted flow through a gallery into a bore core 228, thus feeding the signal pressure chamber 82 and establishing a new larger fixed rate of flow whereby the load piston 164 moves on load stroke at a faster constant rate, for a correspondingly shorter period of linear rate of pressure rise of both signal pressure S and the valve modulated first output pressure P1. So the rate of rise interval 12 earlier described will be shorter but will cover the same full range of pressure, namely from 60 psi as previously to 300 psi as previously.

SHIFT IN THIRD GEAR—FIG. 2

When a shift is made with the transmission 10, not shown, in third gear, the subsequent rate of rise in pressure following fill will be established not only as described, by the first and second means of connection to the signal pressure chamber 82, but also by a third means of connection consisting of the second auxiliary passage 124 which is more or less unrestricted and which communicates essentially the full pressure P1 through a gallery and into the bore core 228 which feeds the signal pressure chamber 82. Although the end points of the rate of rise curve 224, not shown, have the same pressure ordinates at start and finish, the slope is made much steeper and the constant rate of pressure rise is an appreciably larger figure. In other words, a shift when speed 3 is involved can be made both rapidly and smoothly, albeit in the shortest rate of rise interval 12.

SPEED CHANGE IN SAME RANGE—FIG. 1

Speed changes can be made from among the selected ones of the piston and cylinder units 1, 2 or 3 without disturbing the direction valve spool 54, which can be left remaining in the forward position F, for example, as shown in FIG. 1.

Hence, the clutch filling process will involve only the selected speed clutch, and the clutch F will remain filled during the change speed.

Figure 8:
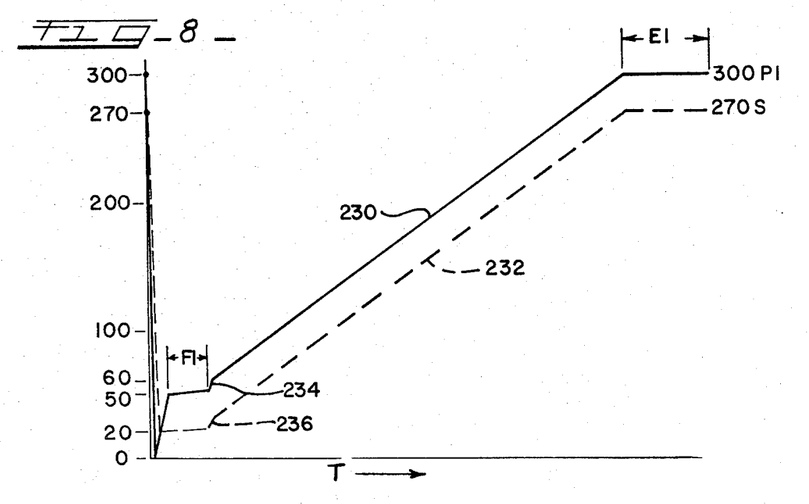
FIG. 8 is a graphical representation of complete pressure traces associated with the operation.

SHIFT CYCLE PRESSURE CURVES—FIG. 8

The solid line curve 230 represents the pressure trace for valve output P1 and also valve output pressure P2 during a full cycle. The broken line curve 232 represents the signal pressure S trace for the same cycle.

Following the pressure drop of both pressures at the outset of a shift, represented as essentially vertical straight lines at the extreme left, the simulated clutch fill piston 194, not shown, insures an approximate 30 psi differential of the pressure P1 over the signal pressure S during the immediately ensuing fill interval F1.

Following fill, the sharp 10 psi pressure rise reflected at 234 in the solid line curve 230 and reflected at 236 in the broken line curve 232 is due to the sudden drop in flow upon filling of the clutch involved. That is, both pressures rise by about the amount of pressure rise across fill orifice 32, not shown, which no longer will generate any appreciable drop thereacross.

The major portions of the curves 230 and 232 representing the modulated linear rates of rise of pressure and also those horizontal portions representing the equilibrium time E1 at full clutch pressure show a constant differential of about 30 psi between the pressures P1 and S due to the equivalent 30 psi mechanical compression residual in the modulation valve spring 104, FIG. 2.

SIMULTANEOUS SHIFT—FIG. 8

In a shift requiring that the transmission go from a condition of, for instance, R1 to F2, both the speed spool 48 and the direction spool 54, not shown, are newly positioned and newly detented in their respective new positions. The piston and cylinder unit F and also the piston and cylinder unit 2 require filling, so that the normally rather short fill time F will appear on the pressure trace as just about twice as long an interval as the previous fill time F1 discussed in connection with FIG. 8. Otherwise, the rate of rise modulation curves will appear the same and both clutch engagements will occur in the desired way.

For greater clarity, it becomes convenient to refer to both of the valve connected conduits in pump line 24 upstream of the fill orifice 32 in FIG. 2 as being the respective modulating pressure signal connection 28 and modulated pressure signal connection 30; the reason obviously is attributed to the difference in interplay between the modulating valve piston element 58 and each of those pressure signals.

Providing conduit 30 as a separate external connection is, as a matter of practicality, unnecessary in making available the required modulating pressure signal to the modulating piston element 58. The latter can be structurally modified instead, accomplishing the purpose itself as will now be explained.

Figure 9:
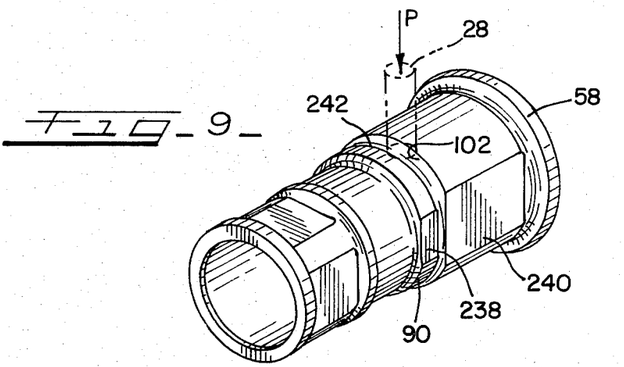
FIG. 9 is an isometric view of a modified form of a modulating valve appearing in longitudinal cross section in FIGS. 2, 3, 4 and 5, foregoing.

MODIFIED MODULATING PISTON 58—FIG. 9

In actual practice, the piston 58 according to a modified form of the invention is machined, at among other places, with pairs of diametrically opposed parallel flats both as formed on the cylindrical regulating valve land 90 and as formed on the relatively larger circumference of the head-end land presenting the large shoulder 102; one of the former pair appears as the numeralled flat 238 on the smaller diameter land 90 and one of the latter appears as the numeralled flat 240 on the large diameter, head-end land.

So when pump pressure P is introduced to the valve piston into the groove 242, as defined between the lands therein, through the inwardly directed modulating pressure signal connection 28 retained, the path from the latter splits because divided by the piston to take the modulated direction across the flats provided, axially toward regulating land 90 and also to take the modulating axial direction across the flats provided, toward the head-end of the piston 58, respectively.

The moduated and modulating pressures of valve piston 58 have proven generally satisfactory in operation here and, in the manners described so far, both of the corresponding connections therefor have originated at line 24 on the upstream side of the clutch fill orifice 32. In the theoretical case of zero clutch leakage, no pressure drop whatever occurs across orifice 32, and P and P1 stay exactly equal throughout clutch rate of rise and engagement. So the desired 30 psi differential across rate of rise orifice 186 stays constant, insuring linear rate of rise.

In practice, and just starting to be perceptible at moderate rates of clutch leakage, the pressure relationship turns out to be P>P1>S. The effects are most pronounced at the high pressure end of the clutch rate-of-rise curve, where leakage, for example, of about 3 gpm (11 liters a minute) going through fill orifice 32, might cause a P to P1 drop of as much as 10 psi (69 kPa), resulting in a decrease of the required 30 psi, P to S differential across timing orifice 186 down to only a 20 psi differential at full clutch engagement pressure.

So as the clutch pressure of engagement climbs with each shift, the rate of rise shows a less than constant increase, as a trace now to be explained will make clear, graphically so.

Figure 10:
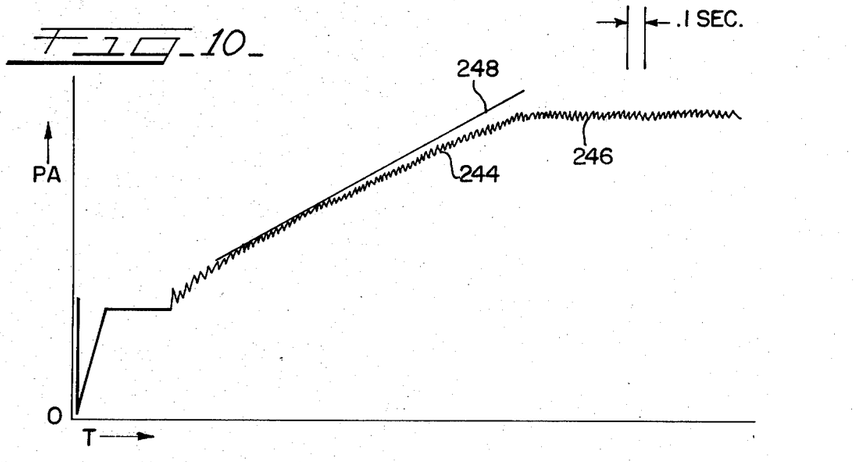
FIGS. 10 and 11 are a graphical representation of a portion of a pressure trace respectively less desirably and more desirably associated with the operation of the control system foregoing.

TRACE OF FOREGOING EXAMPLE—FIG. 10

In this figure, graphically showing rising clutch engagement pressure of the foregoing example plotted against time, the diagonally upwardly curving trace 244 as it approximates, if not reaching, a constant 300 psi plateau in the section 246 at steady state, starts on a long radius gradually to curve away at the top from the true linear rate-of-rise asymptote 248.

In the situation of severe seal degradation, clutch leakage can worsen and, near the top, the trace 244 of clutch pressure P1 in that situation can even less sharply curve away, sooner and more sweepingly than graphed; so full clutch engagements can slow a shift because they will no longer take place smartly and will take longer to complete.

Figure 11:
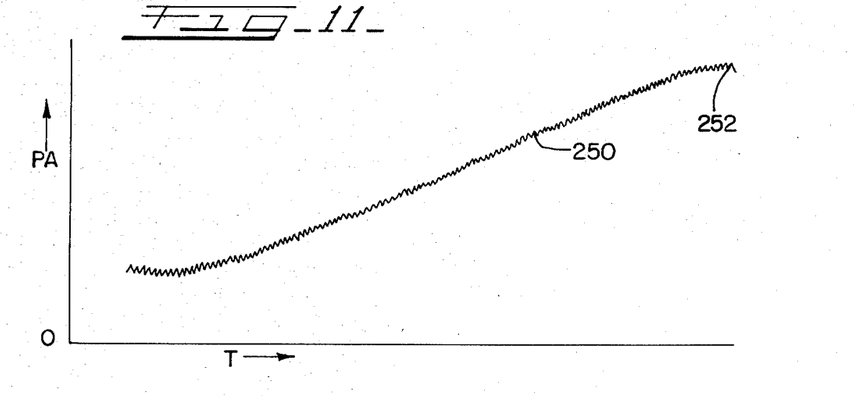

CURED TRACE—FIG. 11

P1 feedback signal means can be provided in order that the trace 250 in this figure, graphically showing pressure plotted against time, will be cured so as to exhibit a truly linear function during the uncommon, extreme conditions of worsening leakage as suggested. That is, the pressure trace breaks as desired abruptly away in its climb and forthwith turns almost at a single point and steadies in the pressure section 252 on its constant full clutch engagement plateau.

In the clutching operation as graphed, the leakage at full clutch engagement pressure here was the same 3 gpm as before, yet the P1 (or valve cavity pressure C) to S differential held steady at the 30 psi differential desired, all throughout the rise in pressure.

Figure 12:
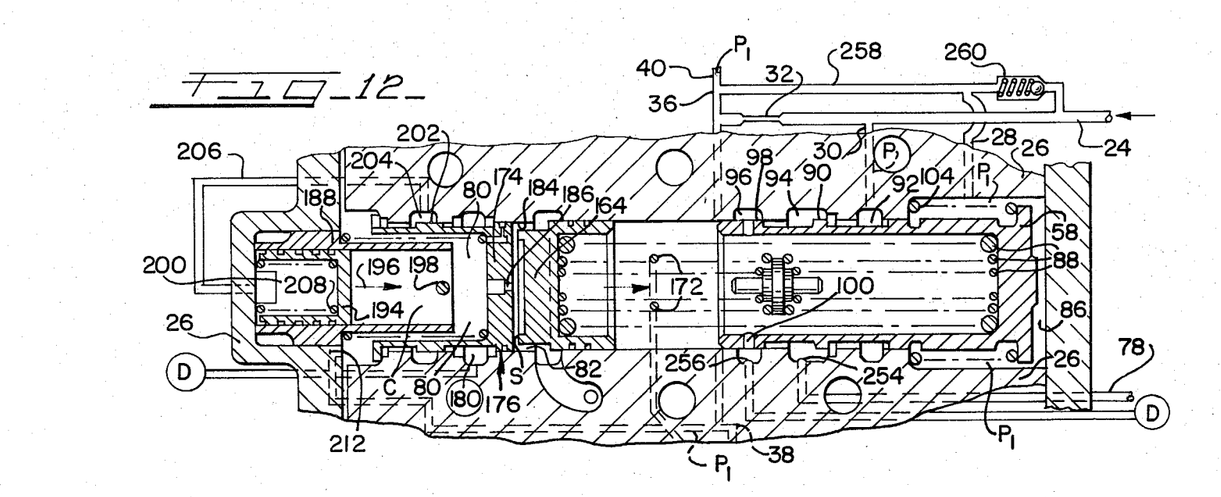
FIGS. 12, 13 and 14 show modified forms of the embodiment of the invention appearing in FIGS. 2-5.

MODIFICATION FOR FEEDBACK SIGNAL—FIG. 12

Illustrative of one such P1 feedback signal means is the modulating valve 26 with the modified pressure signal connection appearing in this figure.

The circuit environment remains the same, with the clutch-connected, pump pressure line 24 extending with portions on the respective upstream and downstream sides of the clutch fill orifice 32. Further, the dump lands 90 and 98 of piston element 58 progressively function with the same bleed-hole principle, first, to bleed off pressure through core 94 into the hole 254 opening into converter line 78 and, second, to bleed off further pressure as necessary through core 96 into the hole 256 opening into drain line D.

The modification is that a feed-back conduit 258 is here shown to be line-connected downstream of fill orifice 32 and tee 36, and it reconnects by way of a feed-back signal so as to deliver clutch pressure P1 in a path to the modulating valve as the operating pressure thereon modulated thereby. The specific path is from conduit 258 through modulating signal connection 28 into the modulating pressure chamber 86.

The calibrated valve seating spring 104 which augments the thrust of the load piston 164 thus insures that the valve 58 is constantly biased to hold constant the 30 psi (205 kPa) differential by which clutch pressure P1 exceeds the signal pressure S, whereby the flow differential across, and flow through, the rate of rise orifice 186 are held constant irrespective of fill orifice flow rate.

A catastrophic failure in a transmission clutch cylinder while connected to the downstream valve lines 38 or 40 can produce substantial leakage flow through fill orifice 32, which must make up for all clutch leakage. Orifice 32 during such a failure can back-up the upstream pump pressure much above the 300 psi (2,050 kPa) operating pressue designed for. A relief valve 260 set for 100 psi (690 kPa) or 150 psi (1,025 kPa) is therefore provided; it is connected in said line 24 (for high pressure bypass) hydraulically in parallel with the fill orifice 32. A blown seal in a clutch cylinder is an example of an extreme transmission failure.

Because the valve 260 directly connects the upstream and downstream sides by opening between the two to prevent very high pump pressure, the valve 260 as shown in FIG. 12 will noramlly remain closed.

The piston valve 58 is sufficiently versatile to perform its modulating function if feed-back means is provided to render downstream pressure as the pressure which is being modulated. The upstream pressure will perforce modulate accordingly, as will be evident from the following.

Figure 13:
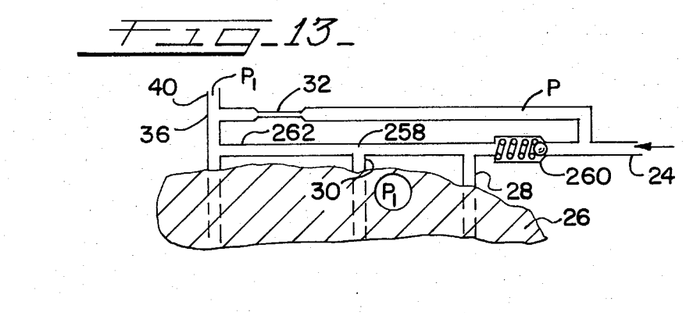

ANOTHER FEEDBACK MODIFICATION—FIG. 13

Illustrative of one such means is the modulating valve housing 26 with which the modified feedback circuit connection is provided as appears in this Figure, and in which the operation, if operable at all, will deteriorate to being decidedly substandard if the associated fill orifice selected happens to be moderately or drastically restrictive to flow.

Anyway the circuit environment, which is absent from this figure's fragmentary showing, conforms to the FIG. 12 showing that the orifice 32 downstream pressure P1, present in differential pressure chamber 80 and in modulating pressure chamber 86, acts in the latter chamber on the end of valve piston 58 to balance the opposing combined 30 psi force of spring 104 and the load piston force caused by signal pressure S in chamber 82; therefore, the pressure differential across the rate of rise or timing orifice 186 is sustained at a constant 30 psi (excess of each of P1 and C over S), insuring the desired constant rate of movement of the load piston 164 as it vacates the chamber 82 on a load stroke.

The modification is that the conduit 258 supplying the feed-back signal to the modulating connection 28 is fed by a feed-back line 262 which also feeds clutch pressure P1 to the modulated connection 30 so as to be modulated by the valve 58, not shown, in the modulating valve housing 26.

Therefore, the downstream pressure P1 and the correspondingly modulated upstream pressure P are modulated by modulating the former pressure P1 as delivered through feedback line 262 for bleed-hole modulation.

The same pressure limiting type relief valve 260 set to open in the mentioned range of 100 psi to 150 psi is installed connected hydraulically in parallel with the fill orifice 32. If P pressure tends to increase out of this range above the P1 pressure, the valve 260 will open to present P from exceeding the pressure differential range.

The piston element 58, if machined with flats in accordance with the showing of FIG. 9 preceding, will afford a like advantage to the embodiment of FIG. 13 just as can be achieved by the embodiment of FIG. 2 preceding. The advantage is that modulated signal connection 30, which is made externally as FIG. 13 schematically illustrates, can be eliminated therefrom for the same reason, namely, that the flats on the piston element intercommunicate the core 92 and chamber 86, not shown.

So fluid flowing to the bleed hole for regulation via flats 238 and regulating land 90 (FIG. 9) is delivered thereby under the same downstream pressure P1 (FIG. 13) being applied as feedback signal to the modulating valve, not shown, contained within the modulating valve housing 26 fragmentarily appearing in FIG. 13.

If the modulating and modulated conduits 28 and 30, having their signal connections which are different from one another as disclosed in accordance with the description of FIG. 12, are switched around in their connections, an additional embodiment of the invention will result.

Figure 14:
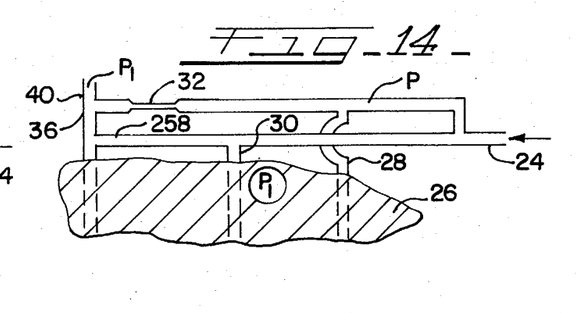

ADDITIONAL EMBODIMENT—FIG. 14

Such additional embodiment will appear as illustrated in this figure but, while the result can be satisfactory, the resulting operation will, if operable at all, deteriorate to being decidedly substandard if the associated orifice selected happens to be moderately or drastically restrictive to flow. Anyway, specifically, pump pressure P is fed from the upstream side of line 24 through the modulating pressure connection 28 as the operating pressure on the regulating valve in regulating housing 26. Feed-back line 258 supplies downstream fluid at clutch pressure P1 to the bleed-hole via modulated pressure connection 30 and the regulating valve in regulating housing 26.

Here again the relationship in practice turns out to be $P > P1 > S$, which is already perceptible among the relative pressures at moderate rates of clutch leakage. Therefore, the overall adaptability of the FIG. 14 embodiment becomes more curtailed at and after the clutch leakage of a system should happen to increase in service to substantial amounts.

It will be apparent from the foregoing that different embodiments disclosed of my invention make the scheduling function independent of the variables of the system such as line resistance, pressure drop, and clutch piston displacement, and at least certain embodiments make the scheduling function independent of the rate of leakages of the clutch cylinders. So the starting rate-of-rise pressure will always be at a reduced level in the scheduling cycle, and smooth clutch engagement will be assured. Almost as soon as the clutch cylinder or cylinders complete filling each time, the dump valve will shift rightwardly as shown in the drawings into fully closed position, and the simulated clutch piston after bottoming will reset rightwardly to its starting position as viewed in the drawings, all ready for the next shift. In effect the piston 194 located inside sleeve 188 within the dump valve cavity, FIG. 5, is like a small clutch piston being subjected to an equal or at least an equivalent pressure during clutch fill as the clutch of the selected group, or clutches of the selected groups, are being likewise subjected. Therefore despite its relative hydraulic remoteness to the latter, the rate of rise valve assembly in housing 26 essentially knows the actual clutch pressure PA because PA is artificially approximated close-by by cavity pressure C in the differential chamber 80. And last but not least, a simple reconnection to the downstream side of a clutch fill orifice provides for utility of a pressure feedback signal as the operating pressure applied to a rate-of-rise pressure modulating valve, insuring in turn to the load-piston-loaded, latter valve that the loading thereon for rate-of-rise control will consistently be applied at a steady rate.

Variations within the spirit and scope of the invention described are equally comprehended by the foregoing description.

What is claimed is:

1. In a rate of rise valve assembly (26) for applying clutch engagement pressure (P1) in the clutch-connected line (24) of a power shift transmission, said line extending upstream and downstream of a fill orifice (32) included therein for transmitting the clutch pressure (P1) on the downstream side, and susceptive of causing an unwanted substantial drop in clutch pressure (P1) upon a substantial increase in fill orifice flow, said assembly having a signal pressure chamber (82) spaced from a bore end (86) in said assembly, and a modulating valve (58) in said bore end (86) in said assembly connected to said line and having a load piston (164) movably mounted in said chamber in the space intermediate to said modulating valve, and operatively connected for loading the latter under load of signal pressure (S), and a rate of rise orifice (186) effective to communicate flow into the signal chamber (82) at a relatively reduced signal pressure (S) therein in response to an excess of pressure being fed to the rate of rise orifice (186), said modulating valve operating under a modulating pressure and on the bleed hole principle to bleed off less and less pressure from said line into the bleed hole by controlled modulation so as to raise pressure more and more in said line, the improvement comprising:

means (212) of feeding-back clutch-pressure (P1) connected to the rate of rise orifice, for delivering clutch pressure as the excess pressure fed thereto and connected to the modulating valve as the operating pressure thereon modulated thereby; and     flow means (28) connecting said line (24) to the bleed hole (254) in a path including the modulating valve (58) to modulate the flow means and the pressure as accordingly modulated in said line.

2. In a rate of rise valve assembly for applying clutch engagement pressure (P1) in the clutch-connected line (24) of a power shift transmission, said line extending upstream and downstream of a fill orifice (32) included therein for transmitting the clutch pressure (P) on the downstream side, and susceptive of causing an unwanted substantial drop in clutch pressure (P1) upon a substantial increase in fill orifice flow, said assembly having a signal pressure (S) chamber (82) spaced from a bore end (86) in said assembly, a modulating valve (58) in said bore end (86) in said assembly connected to said line and having a load piston (164) movable mounted in said chamber in the space intermediate to said modulating valve, and operatively connected for loading the latter under load of signal pressure (S), and a rate of rise orifice (186) effective to communicate flow into the signal chamber at a relatively reduced signal pressure (S) therein in response to an excess of pressure being fed to the rate of rise orifice,     the improvement comprising:

means connected (212, 82) to apply pressure across said rate of rise orifice (186) at the flow differential from the excess of clutch pressure (P1) over the relatively reduced signal pressure (S);

feedback means (258) to apply clutch pressure to the modulating valve (58) as the operative pressure (P1) thereon modulated thereby; and     calibrated means (104) augmental to the load piston insuring that the modulating valve is constantly biased to hold constant the differential by which clutch pressure (P1) exceeds the signal pressure (S), whereby the flow differential across, and flow through, the rate of rise orifice are held constant irrespective of fill orifice (32) flow rate.

3. The invention according to claims 1 or 2, characterized by:

a connection (30) to the modulating valve (58) of said line (24) being from the latter's upstream side (FIG. 12).

4. The invention according to claims 1 or 2, characterized by:

a connection (30) to the modulating valve of said line (24) being from the latter's downstream side (FIG. 13).

5. The invention according to claims 1 or 2, further comprising:

a relief valve (260) connected in said line for high pressure bypass, hydraulically in parallel with said fill orifice.

6. In a rate of rise valve assembly (26) for applying clutch engagement pressure (P1) in the clutch-connected line (24) of a power shift transmission, said line extending on the upstream and downstream sides of a fill orifice (32) included therein so as to transmit from pump pressure (P) upstream the clutch pressure (P1) on the downstream side, said assembly having a signal pressure chamber (82) spaced from a bore end (86) in said assembly, and a modulating valve (58) in said bore end (86) having a load piston (164) movably mounted in said chamber in the space intermediate to said modulating valve, and operatively connected for loading the latter under load of signal pressure (S), and a rate of rise orifice (186) effective to communicate flow into the signal chamber (82) at a relatively reduced signal pressure (S) therein in response to an excess of pressure being fed to the rate of rise orifice (186), said modulating valve operating under a modulating pressure and on the bleed hole principle to bleed off less and less pressure from said line into the bleed hole by controlled modulation so as to raise pressure more and more in said line, the improvement comprising:

- line-connected means (28) of feeding pump pressure (P) connected to the modulating valve (58) for delivering pump pressure as the operating pressure thereon modulated thereby;
- line-connected means (212) of feeding-back clutch pressure (P1) connected to the rate of rise orifice (186) for delivering clutch pressure as the excess pressure fed thereto;
- flow means connecting said line to the bleed hole in a path including the modulating valve to modulate the flow means and the pressure as accordingly modulated in said line; and
- calibrated means (104) augmental to the load piston insuring that the modulating valve is constantly biased to hold constant the differenial by which the pump pressure causing modulation exceeds signal pressure.

7. In a rate of rise valve assembly (26) for applying clutch engagement pressure (P1) in the clutch-connected line (24) of a power shift transmission, said line extending on the upstream and downstream sides of a fill orifice (32) included therein so as to transmit from pump pressure (P) upstream the clutch pressure (P1) on the downstream side, said assembly having a signal pressure chamber (82) spaced from a bore end (86) in said assembly, and a modulating valve (58) in said bore end (86) having a load piston (164) movably mounted in said chamber in the space intermediate to said modulating valve, and operatively connected for loading the latter under load of signal pressure (S), and a rate of rise orifice (186) effective to communicate flow into the signal chamber (82) at a relatively reduced signal pressure (S) therein in response to an excess of pressure being fed to the rate of rise orifice (186), said modulating valve operating under a modulating pressure and on the bleed hole principle to bleed off less and less pressure from said line into the bleed hole by controlled modulation so as to raise pressure more and more in said line, the improvement comprising:

- line-connected means of feeding-back clutch-pressure (P1) connected (212) to the rate of rise orifice (186), for delivering clutch pressure as the excess fed thereto and connected to the modulating valve as the operating pressure thereon modulated thereby;
- flow means (30) connecting said line to the bleed hole in a path including the modulating valve to modulate the flow means and the pressure as accordingly modulated in said line; and
- calibrated means (104) augmental to the load piston (164) insuring that the modulating valve is constantly biased to hold constant the differential by which clutch pressure (P1) exceeds the signal pressure (S), whereby the flow differential across, and flow through, the rate of rise orifice are held constant irrespective of fill orifice flow rate.

* * * * *